US012262460B2

(12) United States Patent
Kou

(10) Patent No.: US 12,262,460 B2
(45) Date of Patent: Mar. 25, 2025

(54) FAST ANNEALING EQUIPMENT

(71) Applicants: HIGHLIGHT TECH CORP., Tainan (TW); Finesse Technology Co., Ltd., Hsinchu County (TW)

(72) Inventor: Chwung-Shan Kou, Hsinchu County (TW)

(73) Assignees: HIGHLIGHT TECH CORP., Tainan (TW); Finese Technology Co., Ltd., Hsinchu County (TW)

( * ) Notice: Subject to any disclaimer, the term of this patent is extended or adjusted under 35 U.S.C. 154(b) by 40 days.

(21) Appl. No.: 17/692,221

(22) Filed: Mar. 11, 2022

(65) Prior Publication Data

US 2023/0217558 A1 Jul. 6, 2023

(30) Foreign Application Priority Data

Dec. 30, 2021 (TW) ................................ 110149586

(51) Int. Cl.
*H05B 6/64* (2006.01)
*H01L 21/67* (2006.01)
(Continued)

(52) U.S. Cl.
CPC ............... *H05B 6/686* (2013.01); *H05B 6/72* (2013.01); *H05B 6/80* (2013.01)

(58) Field of Classification Search
CPC .... H05B 6/68; H05B 6/64; H05B 6/70; H01L 21/67115; H01L 2223/6677
See application file for complete search history.

(56) References Cited

U.S. PATENT DOCUMENTS 4,270,083 A * 5/1981 Fitzky ........................ H01P 7/06 324/636
4,667,076 A * 5/1987 Amada .................... C30B 25/12 438/758
(Continued)

FOREIGN PATENT DOCUMENTS

IN 105379416 8/2019
JP H06201771 7/1994
(Continued)

OTHER PUBLICATIONS

Sundaresan et al., "Comparison of Solid-State Microwave Annealing with Conventional Furnace Annealing of Ion-Implanted SiC", Journal of Electronic Materials, vol. 36, No. 4, 2007, p. 324-331.

*Primary Examiner* — Steven W Crabb
*Assistant Examiner* — Lawrence H Samuels

(57) ABSTRACT

A fast annealing equipment is applicable to the annealing treatment of silicon carbide wafers. The fast annealing equipment comprises a variable frequency microwave power source system, a resonant chamber heating system and a measurement and control system. The variable frequency microwave power source system uses a solid state power amplifier and has the flexibility of fast frequency sweep during heat treatment to compensate for resonant frequency changes due to load effect caused by temperature changes in a material to be annealed. In order to improve an energy efficiency and provide a sufficient microwave energy uniform area, the $TM_{010}$ resonant chamber structure can be used to anneal 4-inch to 8-inch silicon carbide wafers. The measurement and control system combines software and hardware to form an automatic system with instant feedback to provide further flexibility, stability and reliability for the entire equipment.

20 Claims, 2 Drawing Sheets

(51) Int. Cl.
*H05B 6/68* (2006.01)
*H05B 6/72* (2006.01)
*H05B 6/80* (2006.01)

(56) References Cited

U.S. PATENT DOCUMENTS

| | | | | |
|---|---|---|---|---|
| 5,886,326 A * | 3/1999 | Tang | F23G 5/08 | 219/679 |
| 6,097,015 A * | 8/2000 | McCullough | A61L 2/12 | 219/749 |
| 6,097,019 A * | 8/2000 | Lewis | H05B 6/6402 | 219/702 |
| 6,150,645 A * | 11/2000 | Lewis | H05B 6/68 | 219/715 |
| 10,720,310 B2 * | 7/2020 | Kaplan | H01J 37/244 | |
| 2002/0075624 A1 * | 6/2002 | Wang | H01L 21/6831 | 361/234 |
| 2002/0123230 A1 * | 9/2002 | Hubacek | H01J 37/3244 | 438/712 |
| 2004/0238794 A1 * | 12/2004 | Karandikar | H05B 6/80 | 252/500 |
| 2007/0023971 A1 * | 2/2007 | Saha | C04B 35/64 | 264/432 |
| 2007/0108195 A1 * | 5/2007 | Tian | H05B 6/68 | 219/679 |
| 2007/0286967 A1 * | 12/2007 | Ide | H01L 21/02274 | 257/E21.264 |
| 2008/0078505 A1 * | 4/2008 | Kofuji | H01L 21/3065 | 257/E21.252 |
| 2008/0207008 A1 * | 8/2008 | Peelamedu | H01L 21/67115 | 257/E21.333 |
| 2009/0236335 A1 * | 9/2009 | Ben-Shmuel | B65D 81/3453 | 219/710 |
| 2010/0025394 A1 * | 2/2010 | Jussel | A61C 13/203 | 219/759 |
| 2010/0115785 A1 * | 5/2010 | Ben-Shmuel | H05B 6/72 | 34/260 |
| 2011/0198343 A1 * | 8/2011 | Bilchinsky | H05B 6/6447 | 219/678 |
| 2013/0213955 A1 * | 8/2013 | Jussel | H05B 6/6473 | 219/681 |
| 2014/0008352 A1 * | 1/2014 | Uemura | H01J 37/32477 | 219/601 |
| 2014/0087547 A1 * | 3/2014 | Miyano | H01L 21/67103 | 438/530 |
| 2014/0117009 A1 * | 5/2014 | Yamamoto | H05B 6/806 | 219/762 |
| 2014/0256082 A1 * | 9/2014 | Abushama | H01L 21/02568 | 118/725 |
| 2015/0136759 A1 * | 5/2015 | Ikeda | H01L 21/67115 | 219/754 |
| 2015/0235878 A1 * | 8/2015 | Suguro | H01L 21/67115 | 438/795 |
| 2017/0092513 A1 * | 3/2017 | Hosaka | H01L 21/6719 | |
| 2018/0177904 A1 * | 6/2018 | Janowiak | B27K 5/0055 | |
| 2020/0286757 A1 * | 9/2020 | Kowalski | H05B 6/806 | |
| 2020/0365971 A1 * | 11/2020 | Moallem | G01S 7/028 | |

FOREIGN PATENT DOCUMENTS

| | | |
|---|---|---|
| JP | 2005268624 A | 9/2005 |
| JP | 2016081971 A | 5/2016 |
| JP | 2017521556 | 8/2017 |
| JP | 2019178021 | 10/2019 |
| JP | 2020512659 | 4/2020 |
| TW | I555063 | 10/2016 |
| TW | M628545 | 6/2022 |
| WO | WO2021118688 A1 | 6/2021 |

* cited by examiner

FAST ANNEALING EQUIPMENT

CROSS-REFERENCE TO RELATED APPLICATION

This application claims priority from Taiwan Patent Application No. 110149586, filed on Dec. 30, 2021, in the Taiwan Intellectual Property Office, the content of which are hereby incorporated by reference in their entirety for all purposes.

BACKGROUND OF THE INVENTION

Field of Invention

The invention relates to a semiconductor equipment, more particularly to a fast annealing equipment.

2. Description of the Related Art

Silicon carbide (SiC) has wide band gap, high breakdown electric field, high thermal conductivity and excellent chemical inertia, making it an important semiconductor material for the fabrication of high temperature, high power and high frequency components and devices. And ion implantation is an indispensable technology for manufacturing SiC semiconductor components. While annealing is a necessary step to remove lattice damage and activate implanted ions after ion implantation. For silicon carbide, post-ion implantation annealing at temperatures greater than 1,500° C. is required to achieve process effects.

Conventional annealing is usually carried out in a ceramic furnace with resistance heating or low frequency induction heating. However, the slow heating/cooling rate (20° C./min) of ceramic furnace makes it difficult to perform silicon carbide annealing at temperatures above 1,500° C. Because if silicon carbide is exposed to temperatures above 1,400° C. for a long time, the constituent substances on the substrate surface will sublimate and redeposit (commonly known as step bunching), resulting in increased surface roughness of silicon carbide wafers, which limits the maximum annealing temperature. This limitation on annealing temperature may result in insufficient activation of implanted ions, causing higher contact and channel area resistances. At the same time, excessive surface roughness will have negative impacts on the performance of silicon carbide components, one of which is the decrease of inversion layer mobility, resulting in higher conduction resistance of SiC MOSFETs. Recently, although several capping technologies have been proposed to suppress the above problems, these technologies still have their maximum temperature limitations and require complex processing steps. In addition, prolonged exposure of silicon carbide to high temperatures can lead to the formation of carbon-rich surfaces and eventually graphitic surfaces. Another adverse effect of conventional annealing is the out-diffusion and in-diffusion of the implanted boron ions.

In addition to the above-mentioned problems, conventional annealing also has its drawbacks in operation. The first problem is thermal efficiency. The heat dissipation of the furnace body is mainly by radiation, and the amount of radiation increases in direct proportion to the fourth power of the temperature. Therefore, if the area to be heated is very wide, the energy efficiency required for heating is significantly reduced. For resistance heating furnaces, a double tube structure is usually used to avoid heater contamination. Thus, the area to be heated becomes wider. In addition, since the existence of the double tubes keeps the heated material away from the heat source, it is necessary to set the heater at a temperature higher than that of the heated material, which also becomes a factor that greatly reduces the efficiency. Therefore, the thermal capacity of the heating system becomes very large, and it takes a long time to heat up or cool down. The above are the factors that reduce the throughput and the factors that increase the surface roughness of the heated material.

The second problem with conventional annealing is related to the waste of material in the heating furnace. Since the materials that can withstand temperatures above 1,500° C. and can be used in the heating furnace are limited, high-purity materials with high melting points are required. The conventional materials that can be used in silicon carbide annealing furnace are graphite and silicon carbide sintered bodies. However, these materials are expensive, and if the furnace body is large, the replacement requires considerable cost. At the same time, the higher the temperature, the shorter the service life of the furnace body, and the replacement cost is much higher than that of the general silicon wafer annealing technics.

Therefore, in order to avoid the problem of surface deterioration of silicon carbide wafers caused by the slow heating speed of conventional annealing technology, the development of fast annealing technology has become the key. Although halogen lamp and laser technology can achieve fast thermal processing, there are still some problems such as the highest achievable annealing temperature, surface melting, high density of residual defects and redistribution of implants. In contrast, microwave heating has become an effective method for fast annealing of silicon carbide.

Silicon carbide can effectively absorb microwave energy (300 MHz-300 GHz). With a properly designed annealing system, microwaves can provide silicon carbide wafers with very fast heating and cooling rates and good control of annealing time. Microwaves have the characteristics of selective heating, because microwaves are only absorbed by the semiconductor wafer and are not absorbed by the surrounding environment, the annealing heating rate is very fast. At the same time, during the fast annealing process, the temperature increase of the environment around the silicon carbide wafer is limited, and the cooling rate of the silicon carbide wafer can be very high after the microwave source is turned off. In comparison to conventional annealing techniques, silicon carbide annealing using microwaves shows that heating rates can exceed 600° C./s and temperatures can be as high as 2,000° C. Microwave annealing at 1,850° C. for 35 seconds resulted in a surface roughness of 2 nm, compared to a surface roughness of 6 nm using conventional annealing techniques at 1,500° C. for 15 minutes. At the same time, microwave annealing shows excellent performance in sheet resistance and redistribution depth of implanted elements (SIDDARTH G. SUNDARESAN, etc.; Journal of ELECTRONIC MATERIALS, Vol. 36, No. 4, 2007).

Resonant chamber coupling is the most widely used method in microwave heating. Microwave heating furnaces are usually constructed in the form of single-mode resonant chamber or multi-mode resonant chamber operating at a fixed frequency. Single-mode resonant chamber can generate electromagnetic field strength much higher than that of multi-mode resonant chamber and is therefore more suitable for fast heating processes. Heating rates as high as 10° C./sec-100° C./sec can be achieved using single-mode resonant chamber, while the heating rates in multi-mode resonant chamber are relatively lower. However, in the prior art, when the heating rate is further increased to a level well above 100° C./sec, there are some technical obstacles. Firstly, the resonant frequency of the resonant chamber changes as the physical properties of the heated substances change with changes in temperature during heat treatment. Using radio frequency/microwave source with a fixed frequency will result in a mismatch with the resonant chamber. In this way, the reflection of the introduced electromagnetic wave will be greatly increased, which will seriously affect the heating efficiency. Secondly, even though the resonant frequency of the resonant chamber can be tuned mechanically, its slow response to changes will result in a slower heating rate.

SUMMARY OF THE INVENTION

In order to overcome the above-mentioned limitations of the prior art, the invention discloses a technology and equipment for fast and selective heating using a variable frequency microwave source, the technology and the equipment are capable of meeting the requirements of fast heating speed and high heating temperature in an annealing process of silicon carbide wafers.

In the invention, a variable frequency solid state electronic component is used to replace a fixed frequency magnetron as a microwave power source. The variable frequency power source enables selecting an optimum operating microwave frequency and has the flexibility of frequency sweep during heat treatment to compensate for resonant frequency changes caused by temperature changes in a material to be annealed to achieve an optimum energy efficiency. Compared to the traveling-wave tube (TWT) variable frequency sources used in existing commercial systems, the solid state microwave power source employed in the invention is cheaper to manufacture, smaller in size, does not require high voltage systems, and is easier to be electronically controlled.

The invention introduces a directional coupler and a power meter in a measurement and control system to monitor the advancing waves and reflected waves, and an infrared pyrometer connected to a computer for monitoring, tuning and controlling an entire microwave heating process. Since fast heat treatment must be completed in a very short time, it is difficult to manually adjust and control the process. Therefore, the measurement and control system of the invention combines software and hardware to form an automatic system with instant feedback to provide further flexibility, stability and reliability for the entire equipment.

In order to achieve the foregoing object, the invention discloses a fast annealing equipment comprising: a variable frequency microwave power source system using a solid state variable frequency microwave power source to provide a microwave with a first frequency; a resonant chamber heating system comprising a resonant chamber having a wafer carrier base and an antenna, wherein a material to be annealed is placed on the wafer carrier base, the microwave provided by the variable frequency microwave power source system is introduced into the resonant chamber through the antenna and excites a resonant mode in the resonant chamber to perform an annealing on the material to be annealed; and a measurement and control system comprising a directional coupler, a power meter, an optical pyrometer, a gas pressure control system and a computer, wherein the gas pressure control system monitors and controls a gas pressure value of the resonant chamber, the directional coupler detects a forward signal of the microwave provided by the variable frequency microwave power source system and a reflected signal from the resonant chamber heating system, the power meter obtains a power variation according to the forward signal and the reflected signal, the optical pyrometer monitors a temperature value of the material to be annealed, the computer generates an adjustment command correspondingly according to the temperature value and the power variation, the variable frequency microwave power source system performs a frequency sweep mode according to the adjustment command, so as to instantaneously select an optimum operating microwave frequency with a lowest microwave reflection to replace the first frequency in order to compensate for resonant frequency changes of the resonant chamber caused by temperature changes in the material to be annealed.

Preferably, the variable frequency microwave power source system comprises the solid state variable frequency microwave power source and an impedance matching box, the impedance matching box is connected to the antenna, wherein the solid state variable frequency microwave power source comprises a microwave signal generator and a solid state power amplifier, and the microwave signal generator generates a low-power microwave signal to be sent into the solid state power amplifier to generate a high-power microwave.

Preferably, the solid state variable frequency microwave power source and the impedance matching box form a frequency-modulated fast matching mechanism to rapidly reduce reflection of the microwave, wherein the impedance matching box has a fixed impedance, the solid state variable frequency microwave power source enters the frequency sweep mode according to the adjustment command of the measurement and control system, so as to select the optimum operating microwave frequency with the lowest microwave reflection as a second frequency of the microwave in order to compensate for resonant frequency changes of the resonant chamber caused by temperature changes in the material to be annealed.

Preferably, the gas pressure control system comprises a pressure detection unit disposed on the resonant chamber for monitoring the gas pressure value of the resonant chamber, and the gas pressure control system further comprises an exhaust unit and a gas introducing unit respectively connected to the resonant chamber, so that the gas pressure value of the resonant chamber is maintained at a predetermined gas pressure.

Preferably, the fast annealing equipment of the invention further comprises a monitor electrically connected to the computer to display monitoring results of the measurement and control system in real time.

Preferably, before a high-power annealing process is performed, an impedance element of an impedance matching box has been adjusted so that the reflected microwaves are very small and matching conditions can be met. When the high-power annealing process is performed, physical properties of the material to be annealed are changed due to an increase in temperature, which in turn changes a resonant frequency of a microwave resonant chamber to cause an increase in a microwave reflection amount. At this time, the measurement and control system sends an adjustment command to the solid state variable frequency microwave power source to adjust to a fast frequency sweep mode to obtain an operating frequency with minimum reflection and achieve impedance matching with a resonant chamber heating system.

Preferably, the resonant chamber of the resonant chamber heating system comprises a cavity composed of an upper disc, a hollow cylinder and a lower disc, wherein the upper disc and the lower disc are respectively disposed on two sides of the hollow cylinder.

Preferably, the antenna of the resonant chamber is composed of a metal ball connecting to a metal rod, the metal rod is disposed on the upper disc and connected to the impedance matching box of the variable frequency microwave power source system in order to introduce the microwave into the resonant chamber through the antenna.

Preferably, the upper disc and the lower disc are respectively parabolic discs.

Preferably, inner surfaces of the upper disc and the lower disc are respectively coated with an infrared reflection layer.

Preferably, the wafer carrier base is located at a center of the resonant chamber, and the center is an area where a microwave energy is the strongest.

Preferably, the wafer carrier base is rotatably disposed in the resonant chamber, so as to increase an annealing uniformity of the material to be annealed.

Preferably, the wafer carrier base comprises a seat and an upper cover, and the material to be annealed is placed in an accommodating chamber formed by the seat and the upper cover.

Preferably, the wafer carrier base absorbs a portion of the microwave to generate a heat to heat the material to be annealed by conduction, and the wafer carrier base enables another portion of the microwave to penetrate and directly heat the material to be annealed in the accommodating chamber of the wafer carrier base.

Preferably, the wafer carrier base of the resonant chamber is composed of a microwave absorbing material, and enables more than 50% of the microwave to penetrate to heat the material to be annealed.

Preferably, the microwave absorbing material is porous sintered silicon carbide with a porosity between 20% and 30%, or graphite.

Preferably, the first frequency of the microwave is in a range of 433.05-434.79 MHz or 902-928 MHz, a frequency sweep range of the frequency sweep mode is ±10 MHz, the resonant chamber is a structure of single TM010 resonance mode, and a cavity quality factor (Q) of the resonant chamber exceeds 6,000.

Preferably, the first frequency of the microwave is 434 MHz, and a diameter of the resonant chamber is 500 mm.

Preferably, the first frequency of the microwave is 500 MHz.

Preferably, the material to be annealed is silicon carbide.

Preferably, the material to be annealed is a silicon carbide wafer.

In summary, the fast annealing equipment of the invention has the following advantages and features:

(1) the 434 MHZ microwave resonant chamber is used for the fast annealing reaction of the silicon carbide wafer, the single $TM_{010}$ resonant mode adopted is capable of providing sufficiently uniformed electromagnetic field area to process 4-inch to 8-inch wafers, the cylindrical resonant chamber comprises the upper and lower inner surfaces composed of parabolic curves, which is capable of solving the problem of a large amount of radiation loss of silicon carbide wafers at high temperatures in order to meet the requirements of heating over 1,500 degrees Celsius to 2,000 degrees Celsius;

(2) using the variable frequency solid state microwave source instead of a fixed frequency magnetron as the microwave power source has the flexibility of frequency sweep during heat treatment, which enables selecting an optimum operating microwave frequency to compensate for resonant frequency changes of the microwave resonant chamber caused by temperature changes in the material to be annealed. At the same time, the variable frequency solid state microwave source forms a fast matching mode with the impedance matching box to meet the requirements of fast annealing;

(3) in addition to fixing the silicon carbide wafer, the wafer carrier base of the resonant chamber is capable of absorbing a portion of the heat generated by the microwave and conducting the heat uniformly onto the silicon carbide wafer to prevent the silicon carbide wafer from cracking due to internal thermal stress, at the same time, enabling most of the microwave to penetrate to heat the silicon carbide wafer, and also preventing overheating at the edges of the silicon carbide wafer; and (4) the measurement and control system combines software and hardware to form an automatic system with instant feedback to provide further flexibility, stability and reliability for the entire equipment.

DETAILED DESCRIPTION OF THE INVENTION

Figure 1:
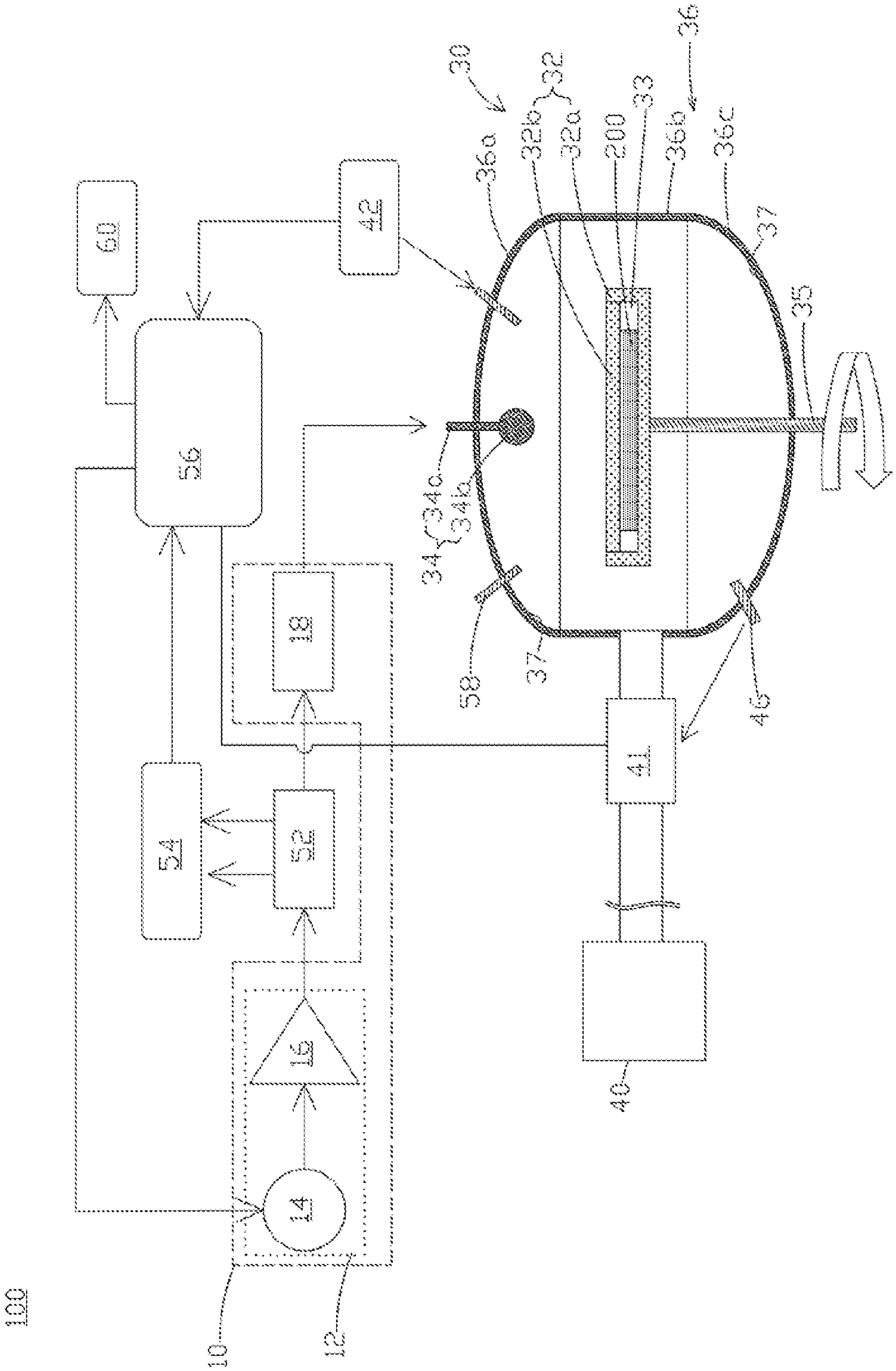
FIG. 1 is a schematic diagram of a structure of a fast annealing equipment of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as “first”, “second”, “third” used in the descriptions are not indicating an order or sequence, and are not intending to limit the scope of the present invention. They are used only for differentiation of components or operations described by the same terms.

Moreover, the terms “comprising”, “including”, “having”, and “with” used in the descriptions are all open terms and have the meaning of “comprising but not limited to”.

The invention discloses a fast annealing equipment using a microwave capable of quickly and selectively heating a material to be annealed to a very high temperature, and capable of meeting the requirements of fast heating speed and high heating temperature in an annealing process of silicon carbide wafers. The fast annealing equipment of the invention can be divided into three main parts: (1) a variable frequency microwave power source system, (2) a resonant chamber heating system, and (3) a measurement and control system (i.e., monitoring and control system). The microwave is generated by a solid state variable frequency microwave power source, and is coupled to the resonant chamber heating system through an impedance matching box to heat a target object (i.e., the material to be annealed). Wherein, the measurement and control system is used for tuning, monitoring and controlling of a microwave heating process.

Figure 2:
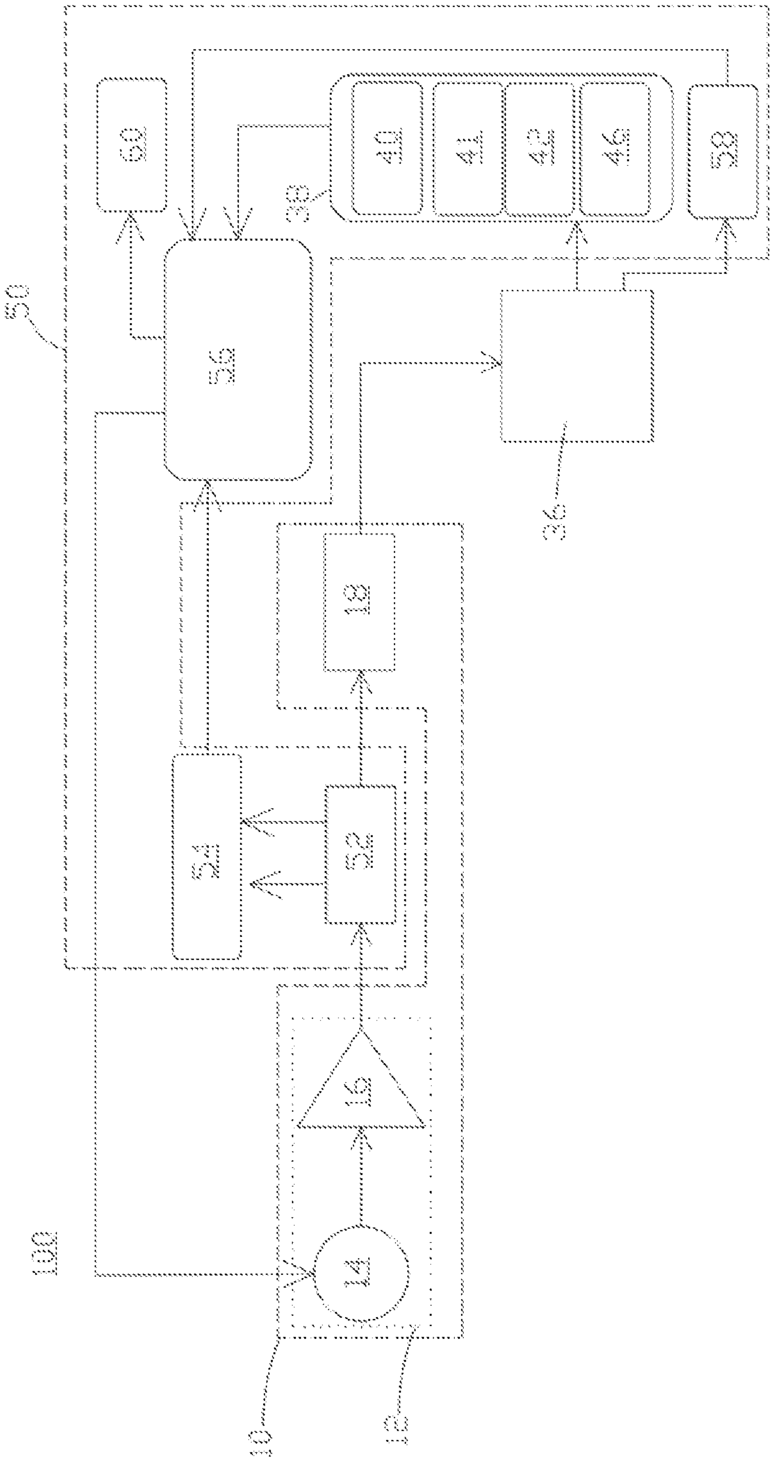
FIG. 2 is a block diagram of a circuit of the fast annealing equipment of the invention.

Please refer to FIG. 1 and FIG. 2, FIG. 1 is a schematic diagram of a structure of a fast annealing equipment of the invention; and FIG. 2 is a block diagram of a circuit of the fast annealing equipment of the invention. A fast annealing equipment 100 of the invention comprises: a variable frequency microwave power source system 10, a resonant chamber heating system 30 and a measurement and control system 50. The variable frequency microwave power source system 10 of the invention uses a solid state variable frequency microwave power source 12 to provide a microwave with a first frequency. The microwave frequency (i.e., the first frequency) used in the invention is 434 MHz as an example, but is not limited thereto.

The resonant chamber heating system 30 comprises a resonant chamber 36 having a wafer carrier base 32 and an antenna 34, wherein a material to be annealed 200 is placed in an accommodating chamber 33 of the wafer carrier base 32 of the resonant chamber 36. The microwave provided by the variable frequency microwave power source system 10 is introduced into the resonant chamber 36 through the antenna 34 of the resonant chamber heating system 30 and excites a resonant mode in the resonant chamber 36 to anneal the material to be annealed 200. The material to be annealed 200 is, for example, silicon carbide, and is, for example, a silicon carbide wafer. However, although the invention is exemplified by using the material to be annealed 200 as a silicon carbide material, and a silicon carbide wafer is specifically exemplified, the invention is not limited thereto. Any material that can be annealed, regardless of whether it requires fast heating, is applicable to the invention.

The measurement and control system 50 detects a forward signal of the microwave provided by the variable frequency microwave power source system 10 and a reflected signal from the resonant chamber heating system 30, so as to generate an adjustment command correspondingly in real time according to changes of the forward signal and the reflected signal, so that the variable frequency microwave power source system 10 enters a frequency sweep mode according to the adjustment command to find an optimum operating microwave frequency with a lowest microwave reflection and instantaneously select the optimum operating microwave frequency with the lowest microwave reflection as a second frequency to replace the original first frequency, thereby resonant frequency changes generated by the material to be annealed 200 are compensated to achieve minimum reflected waves.

In detail, in the fast annealing equipment 100 of the invention, the variable frequency microwave power source system 10 comprises the solid state variable frequency microwave power source 12 and an impedance matching box 18, the impedance matching box 18 is connected to the antenna 34 (i.e., coupled to the antenna), wherein the solid state variable frequency microwave power source 12 comprises a microwave signal generator 14 and a solid state power amplifier (SSPA) 16. The microwave signal generator 14 is used to generate a low-power microwave signal, and the solid state power amplifier 16 is used to amplify the low-power microwave signal to generate a high-power microwave, wherein the variable frequency microwave power source system 10 uses the impedance matching box 18 for impedance matching to reduce reflection of the microwave, improve energy efficiency and maintain the safety of the microwave power source. The invention belongs to industrial application, and its usable frequencies belong to ISM band (Industrial Scientific Medical Band). According to the provisions of the ITU Radio Regulations, the microwave ranges are: 433.05-434.79 MHz, 902-928 MHz, 2400-2483.5 MHz, etc. Because the higher the microwave frequency, the smaller the size of the resonant chamber, and the smaller the energy uniform area. An object of the invention is to be able to process 8-inch wafers, so the $TM_{010}$ single-mode resonance is used, and the resonant chamber diameter is designed to be about 500 mm. With this size, it will be more difficult for microwaves with frequencies higher than 2400 MHz to provide a sufficiently uniformed annealing area and it is prone to excite other resonant modes, not only losing the advantages of single-mode operation, but also less likely to be able to maintain a required uniformity of microwave energy distribution. Therefore, a microwave center frequency used in the invention is preferably in the range of about 433.05-434.79 MHz or 902-928 MHz, preferably 434 MHz. A frequency sweep range of a frequency sweep mode is about ±10 MHz, that is, the frequency sweep range is, for example, the original first frequency of the microwave increased or decreased by 10 MHz, wherein the frequency sweep range is only an example, a value of the frequency sweep range can be increased or decreased according to actual requirements. An output power applicable to the invention can be changed according to the requirements of a manufacturing process, and is not limited to a specific range.

However, the microwave frequency (i.e., the first frequency) applicable to the invention is not limited to the above-mentioned ranges. For example, the invention can also use the microwave frequency of about 2400-2483.5 MHz, and even use frequencies that do not belong to the provisions of the ITU Radio Regulations, such as 500 MHz or other frequencies that require to apply for a license to use. However, the design of the resonant chamber 36 and the size of a wafer that can be processed are preferably changed accordingly, and since a person having ordinary skill in the art should know how to make changes according to the foregoing disclosure of the invention, no further description will be given.

Impedance matching is very important to achieve fast heating. Since changes in physical properties of the material to be annealed 200 due to an increase in temperature will change a resonant frequency of the resonant chamber 36 and cause microwave reflection to reduce a heating efficiency, it is necessary to be capable of responding quickly to reduce microwave reflection to maintain the original heating efficiency. The invention adopts a frequency-modulated fast matching mechanism formed by the solid state variable frequency microwave power source 12 and the impedance matching box 18 to achieve the above requirements. That is, first measure and record changes in a resonant frequency and an impedance of the resonant chamber 36 during a manufacturing process, as well as corresponding ranges of capacitance (C) and inductance (L) when impedance matching is achieved; that is, appropriate values can be selected in the ranges, and impedances of capacitance (C) and inductance (L) are fixed and unchanged. During an annealing process, when a resonant frequency and an impedance of the resonant chamber 36 change, the invention is capable of achieving a fast matching response by changing an operating frequency of the solid state variable frequency microwave power source 12 and in coordination with the above-mentioned fixed impedance matching circuit. That is, the impedance matching box 18 has a fixed impedance, and the solid state variable frequency microwave power source 12 performs a frequency sweep mode on the microwave signal according to the adjustment command generated by the measurement and control system 50 according to reflection of the microwave, thereby achieving an object of reducing reflection of the microwave by finding an optimum microwave frequency. In other words, before a high-power annealing process is performed, an impedance element of the impedance matching box 18 has been adjusted so that the reflected microwaves are very small and matching conditions can be met. When the high-power annealing process is performed, physical properties of the material to be annealed 200 are changed due to an increase in temperature, which in turn changes a resonant frequency of the resonant chamber 36 to cause an increase in a microwave reflection amount. At this time, the measurement and control system 50 sends an adjustment command to the solid state variable frequency microwave power source 12 to adjust to a fast frequency sweep mode to obtain an operating frequency with minimum reflection and achieve impedance matching with the resonant chamber heating system 30. Since a person having ordinary skill in the art should be able to clearly know how to monitor a variation range of load impedance and how to use the corresponding fixed matching circuit according to the disclosure of the invention, no further description will be given.

In the resonant chamber heating system 30 of the fast annealing equipment 100 of the invention, the resonant chamber 36 of the resonant chamber heating system 30 comprises a cavity composed of an upper disc 36*a*, a hollow cylinder 36*b* and a lower disc 36*c*, which are composed of stainless steel. The upper disc 36*a* and the lower disc 36*c* are, for example, parabolic discs, so as to effectively reflect infrared rays radiated from a high temperature silicon carbide wafer onto the material to be annealed 200. The upper disc 36*a* and the lower disc 36*c* are respectively disposed on two sides of the hollow cylinder 36*b*. The antenna 34 of the resonant chamber 36 is composed of, for example, a metal ball 34*b* with a diameter of about 20 mm connecting to a metal rod 34*a* with a diameter of about 10 mm. The metal rod 34*a* is disposed on a center of a top of the upper disc 36*a* and is connected to the impedance matching box 18 of the variable frequency microwave power source system 10 in order to introduce the microwave into the resonant chamber 36 through the antenna 34 and excite the above-mentioned resonant mode in the resonant chamber 36. Wherein, in order to insert or take out the material to be annealed 200, either the upper disc 36*a* or the lower disc 36*c* of the resonant chamber 36 is, for example, detachably connected to the hollow cylinder 36*b*, so as to be able to remove or insert the material to be annealed 200 from top or from bottom. However, the invention is not limited thereto, in another feasible design, the invention can also be changed to dispose an outlet on the hollow cylinder 36*b* in order to remove or insert the material to be annealed 200 from a side. In other words, although the invention is exemplified as above, any technical means that can be used to remove or insert the material to be annealed 200 falls within the scope of protection of the invention.

Wherein, in order to improve an energy efficiency and a proper microwave energy uniform area, the invention preferably uses a 434 MHz microwave source to generate the microwave, the resonant chamber 36 is preferably a structure capable of generating a single $TM_{010}$ resonance mode, and a cavity quality factor (Q) of the resonant chamber 36 exceeds 6,000, so a microwave intensity is very high. Taking the material to be annealed 200 as a silicon carbide wafer as an example, a diameter of the resonant chamber 36 is about 500 mm, which is capable of annealing silicon carbide wafers of various sizes (4 inches, 6 inches and 8 inches). The silicon carbide wafer is placed in the wafer carrier base 32 in a center of the resonant chamber 36 and in an area where a microwave intensity is the highest. Wherein, the wafer carrier base 32 is, for example, rotatably disposed in the resonant chamber 36, so as to increase a heating uniformity of the annealed material to be annealed 200, wherein the wafer carrier base 32 is, for example, disposed on a rotating shaft 35, and the rotating shaft 35 is rotated, for example, by being driven by a motor (not shown in the figures). However, it should be understood that the wafer carrier base 32 of the invention can be rotated by any known technical means, so it is not limited to the above example. Moreover, although the resonant chamber 36 with a diameter of 500 mm is used as an example in the invention, it is not limited thereto. The resonant chamber 36 of the invention can also be selected with other suitable diameters and lengths according to actual requirements.

At very high temperatures, heat dissipation of silicon carbide wafers is dominated by radiation (direct proportional to the fourth power of temperature). At the same time, because the wafer is a flat structure and has a large radiation area, it is necessary to greatly reduce a radiation loss and improve a heating efficiency in order to achieve a required heating temperature. In this embodiment, upper and lower surfaces of the resonant chamber 36 are optically polished parabolic structures (the upper disc 36*a* and the lower disc 36*c*), and an infrared reflection layer 37 is respectively coated on the parabolic structures to improve a reflectivity of infrared rays to make the upper disc 36*a* and the lower disc 36*c* become mirrors to achieve a minimized radiation loss. Wherein, the infrared reflection layer 37 is made of a high reflectivity material such as gold, for example. In addition, an inner surface of the hollow cylinder 36*b* of the resonant chamber 36 can be optionally coated or not coated with the infrared reflective layer 37. The silicon carbide wafer to be heated is located in the resonant chamber 36 and is preferably placed in the wafer carrier base 32 made of a suitable microwave absorbing material. The wafer carrier base 32 is preferably disposed at a central position of the resonant chamber 36, and the central position is an area where a microwave energy is the largest.

In addition to a function of fixing the silicon carbide wafer (i.e., the material to be annealed 200), the wafer carrier base 32 is further capable of evenly distributing the heat generated by absorbing microwaves onto the silicon carbide wafer to prevent the silicon carbide wafer from cracking due to internal thermal stress. For example, the wafer carrier base 32 of the resonant chamber 36 comprises a seat 32*a* and an upper cover 32*b*, wherein the upper cover 32*b* is, for example, detachably covered on the seat 32*a*, in order to form the accommodating chamber 33 by surrounding the accommodating chamber 33, and the material to be annealed 200 is detachably positioned in the accommodating chamber 33 surrounded and formed by the seat 32*a* and the upper cover 32*b*. In addition, the seat 32*a* and/or the accommodating chamber 33 of the wafer carrier base 32 of the invention are not limited to a specific shape. For example, if the material to be annealed 200 is a wafer, a projected shape of the seat 32*a* and/or the accommodating chamber 33 of the wafer carrier base 32 can be, for example, a circle. In addition, although the upper cover 32*b* preferably completely covers the accommodating chamber 33 of the seat 32*a*, so as to completely cover the material to be annealed 200 in the accommodating chamber 33, the invention is not limited thereto, that is, the upper cover 32*b* can also partially cover the accommodating chamber 33 of the seat 32*a* to expose surfaces of the remained and uncovered parts of the material to be annealed 200.

In the invention, the wafer carrier base 32 of the resonant chamber 36, for example, absorbs a portion of the microwave to generate a heat to heat the material to be annealed 200 by conduction, and at the same time the wafer carrier base 32 enables another portion of the microwave to penetrate the silicon carbide wafer for heating reaction which is directly placed in the accommodating chamber 33 of the wafer carrier base 32. Wherein, the wafer carrier base 32 of the resonant chamber 36 is preferably composed of a microwave absorbing material, and preferably capable of enabling more than 50% of the microwave to penetrate to heat the silicon carbide wafer. Porous sintered silicon carbide with a porosity of 20% to 30% is a material suitable for the wafer carrier base 32, mainly because although the 434 MHz microwave is absorbed by silicon carbide, its microwave penetration depth can exceed 20 mm, for the porous silicon carbide produced by sintering, a penetration depth is even larger to be capable of achieving the above-mentioned functions of the wafer carrier base 32, and at the same time, it can be heated and cooled many times without cracking and has a long service life. In addition, graphite can also be used as a material of the wafer carrier base 32.

In addition, a thickness of the silicon carbide wafer is very thin, if being directly exposed to microwaves, edges of the wafer are prone to produce high electric field intensity distribution, which can cause overheating and even point discharge. Therefore, the wafer carrier base 32 preferably covers the edges of the silicon carbide wafer to be annealed, so as to prevent the edges of the silicon carbide wafer from overheating.

In the invention, the measurement and control system 50 further comprises a gas pressure control system 38 disposed on the resonant chamber heating system 30, which is used to monitor and control pressure and introduced gas flow rate of the resonant chamber 36, so that a gas pressure value of the resonant chamber 36 is maintained at, for example, a predetermined gas pressure, wherein the predetermined gas pressure is about 0.1 atmospheric pressure to 10 atmospheric pressure, depending on a manufacturing process. The gas pressure control system 38 comprises a pressure detection unit 46 disposed on the resonant chamber 36 for monitoring the gas pressure value of the resonant chamber 36. The pressure detection unit 46 is, for example, a vacuum gauge. The gas pressure control system 38 further comprises, for example, an exhaust unit 40, a pressure control unit 41 and a gas introducing unit 42, wherein the exhaust unit 40 and the gas introducing unit 42 are respectively connected to the resonant chamber 36. The pressure control unit 41 is a controller for receiving a gas pressure value monitored by the pressure detection unit 46, so as to control operations of the exhaust unit 40 and/or the gas introducing unit 42, so that the gas pressure value of the resonant chamber 36 is maintained at the predetermined gas pressure mentioned above.

In detail, in this embodiment, a gas such as nitrogen or argon is introduced into the resonant chamber 36 through the gas introducing unit 42 according to a set gas supply flow rate, and is exhausted through the exhaust unit 40 connected to an exhaust port of the resonant chamber 36. Before the above-mentioned gas is introduced into the resonant chamber 36 through the gas introducing unit 42, the resonant chamber 36 can be vacuumized by the exhaust unit 40, and then a gas such as nitrogen or argon is introduced into the resonant chamber 36 through the gas introducing unit 42 until the resonant chamber 36 reaches the above-mentioned predetermined gas pressure, thereby inside the resonant chamber 36 is capable of reaching a set pure gas atmosphere. Wherein the gas introducing unit 42 is, for example, a gas source of the above-mentioned gas, and the gas source is connected to the resonant chamber 36 via, for example, a first control valve (not numbered in the figures). The exhaust unit 40 is, for example, a vacuum pump, and the vacuum pump is connected to the resonant chamber 36 via, for example, a second control valve (not numbered in the figures).

In the invention, a gas such as nitrogen or argon can be introduced into the resonant chamber 36 through the gas introducing unit 42 at the above-mentioned gas supply flow rate, and in coordination with the exhaust unit 40, the gas in the resonant chamber 36 can also be exhausted by the exhaust unit 40 at an exhaust flow rate, and the exhaust flow rate corresponds to the gas supply flow rate, so that the gas pressure value of the resonant chamber 36 is maintained at the above-mentioned predetermined gas pressure. However, it should be understood that although the above mentioned technical means is exemplified for maintaining a gas pressure value, the invention is not limited thereto, any technical means can be applied to the invention as long as the gas pressure value of the resonant chamber 36 can be maintained at the above-mentioned predetermined gas pressure. For example, the invention can also omit the pressure control unit 41, and directly receive a gas pressure value monitored by the pressure detection unit 46, and control the gas supply flow rate of the gas introducing unit 42 and the exhaust flow rate of the exhaust unit 40 through a computer 56 to be mentioned later.

In the fast annealing equipment 100 of the invention, the measurement and control system 50 further comprises a directional coupler 52 and a power meter 54. The directional coupler 52 is used to detect input and reflected microwave signals. The detected signals are then sent to the power meter 54 for monitoring coupling between the microwave and the resonant chamber 36 and the material to be annealed 200. In detail, the directional coupler 52 is disposed between the solid state power amplifier 16 and the impedance matching box 18 for detecting the input and reflected microwave signals, that is, the directional coupler 52 can be used to detect the forward signal of the microwave provided by the variable frequency microwave power source system 10 and the reflected signal from the resonant chamber heating system 30. Then, the directional coupler 52 sends the detected signals to the power meter 54 for real-time monitoring of coupling changes (e.g., power change) between the microwave and the resonant chamber 36 and the material to be annealed 200. In this way, the computer 56 is capable of receiving power variation data and correspondingly generating an adjustment command in real time according to the power variation, so as to control operations of the variable frequency microwave power source system 10.

Wherein the measurement and control system 50 further comprises an optical pyrometer 58 for monitoring a temperature value of the material to be annealed 200 in real time. The optical pyrometer 58 is, for example, an infrared pyrometer. In addition, the computer 56 is further electrically connected to the optical pyrometer 58 in order to control an energy input by the microwave according to the temperature value monitored by the optical pyrometer 58 and the adjustment command correspondingly generated according to the power variation, thereby achieving the required heating or cooling temperature control. Wherein, an emissivity of the silicon carbide material measured by a blackbody radiation source used in the invention is 0.74, and this emissivity value can be input into the optical pyrometer 58 to be used for all temperature measurements in the technology disclosed in the invention. In addition, the measurement and control system 50 further comprises, for example, a monitor 60 that is electrically connected to the computer 56 to display monitoring results of the various components of the measurement and control system 50 in real time; for example, all microwave and temperature data can be input into the computer 56 for recording and processing and displayed on the monitor 60 in real time.

In summary, the fast annealing equipment of the invention has the following advantages and features:

(1) the 434 MHZ microwave resonant chamber is used for the fast annealing reaction of the silicon carbide wafer, the single $TM_{010}$ resonant mode adopted is capable of providing sufficiently uniformed electromagnetic field area to process 4-inch to 8-inch wafers, the cylindrical resonant chamber comprises the upper and lower inner surfaces composed of parabolic curves, which is capable of solving the problem of a large amount of radiation loss of silicon carbide wafers at high temperatures in order to meet the requirements of heating over 1,500 degrees Celsius to 2,000 degrees Celsius;

(2) using the variable frequency solid state microwave source instead of a fixed frequency magnetron as the microwave power source has the flexibility of frequency sweep during heat treatment, which enables selecting an optimum operating microwave frequency to compensate for resonant frequency changes of the microwave resonant chamber caused by temperature changes in the material to be annealed. At the same time, the variable frequency solid state microwave source forms a fast matching mode with the impedance matching box to meet the requirements of fast annealing;

(3) in addition to fixing the silicon carbide wafer, the wafer carrier base of the resonant chamber is capable of absorbing a portion of the heat generated by the microwave and conducting the heat uniformly onto the silicon carbide wafer to prevent the silicon carbide wafer from cracking due to internal thermal stress, at the same time, enabling most of the microwave to penetrate to heat the silicon carbide wafer, and also preventing overheating at the edges of the silicon carbide wafer; and (4) the measurement and control system combines software and hardware to form an automatic system with instant feedback to provide further flexibility, stability and reliability for the entire equipment.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A fast annealing equipment comprising:

a variable frequency microwave power source system using a solid state variable frequency microwave power source to provide a microwave with a first frequency;

a resonant chamber heating system comprising a resonant chamber having a wafer carrier base and an antenna, wherein a material to be annealed is placed inside an accommodating chamber of the wafer carrier base, the microwave provided by the variable frequency microwave power source system is introduced into the resonant chamber through the antenna and excites a resonant mode in the resonant chamber to perform an annealing process on the material to be annealed, wherein during the annealing process, the wafer carrier base, which comprises a seat and an upper cover forming the accommodating chamber, is made of a microwave absorbing material that absorbs a portion of the microwave to generate a heat and conducts the heat uniformly onto the material to be annealed, which is placed inside the accommodating chamber of the wafer carrier base, by conduction, and the wafer carrier base enables another portion of the microwave to penetrate therethrough and directly heat the material to be annealed in the accommodating chamber of the wafer carrier base, wherein the wafer carrier base covers the material to be annealed, and the upper cover covers the accommodating chamber, inside which the material to be annealed is placed; and a measurement and control system comprising a directional coupler, a power meter, an optical pyrometer, a gas pressure control system and a computer, wherein during the annealing process, the gas pressure control system monitors and controls a gas pressure value of the resonant chamber, the directional coupler detects a forward signal of the microwave provided by the variable frequency microwave power source system and a reflected signal from the resonant chamber heating system, the power meter obtains a power variation according to the forward signal and the reflected signal, the optical pyrometer monitors a temperature value of the material to be annealed, the computer generates an adjustment command correspondingly according to the temperature value and the power variation, the variable frequency microwave power source system performs a frequency sweep mode according to the adjustment command, so as to thereby instantaneously select an optimum operating microwave frequency with a lowest microwave reflection that compensates for resonant frequency changes of the resonant chamber caused by temperature changes in the material to be annealed by replacing the first frequency with the optimum operating microwave frequency.

2. The fast annealing equipment as claimed in claim 1, wherein the variable frequency microwave power source system comprises the solid state variable frequency microwave power source and an impedance matching box, the impedance matching box is connected to the antenna, wherein the solid state variable frequency microwave power source comprises a microwave signal generator and a solid state power amplifier, and the microwave signal generator generates a low-power microwave signal to be sent into the solid state power amplifier to generate a high-power microwave.

3. The fast annealing equipment as claimed in claim 2, wherein the solid state variable frequency microwave power source and the impedance matching box form a frequency-modulated fast matching mechanism to rapidly reduce reflection of the microwave, wherein the impedance matching box has a fixed impedance, the solid state variable frequency microwave power source enters the frequency sweep mode according to the adjustment command of the measurement and control system, so as to select the optimum operating microwave frequency with the lowest microwave reflection as a second frequency of the microwave in order to compensate for resonant frequency changes of the resonant chamber caused by temperature changes in the material to be annealed.

4. The fast annealing equipment as claimed in claim 1, wherein the gas pressure control system comprises a pressure detection unit disposed on the resonant chamber for monitoring the gas pressure value of the resonant chamber, and the gas pressure control system further comprises an exhaust unit and a gas introducing unit respectively connected to the resonant chamber, so that the gas pressure value of the resonant chamber is maintained at a predetermined gas pressure.

5. The fast annealing equipment as claimed in claim 1, further comprising a monitor electrically connected to the computer to display monitoring results of the measurement and control system in real time.

6. The fast annealing equipment as claimed in claim 1, wherein the resonant chamber of the resonant chamber heating system comprises a cavity composed of an upper disc, a hollow cylinder and a lower disc, wherein the upper disc and the lower disc are respectively disposed on two sides of the hollow cylinder.

7. The fast annealing equipment as claimed in claim 6, wherein the antenna of the resonant chamber is composed of a metal ball connecting to a metal rod, the metal rod is disposed on the upper disc and connected to the impedance matching box of the variable frequency microwave power source system in order to introduce the microwave into the resonant chamber through the antenna.

8. The fast annealing equipment as claimed in claim 7, wherein the upper disc and the lower disc are respectively parabolic discs.

9. The fast annealing equipment as claimed in claim 7, wherein inner surfaces of the upper disc and the lower disc are respectively coated with an infrared reflection layer.

10. The fast annealing equipment as claimed in claim 1, wherein the wafer carrier base is located at a center of the resonant chamber, and the center is an area where a microwave energy is the strongest.

11. The fast annealing equipment as claimed in claim 1, wherein the wafer carrier base is rotatably disposed in the resonant chamber, so as to increase an annealing uniformity of the material to be annealed.

12. The fast annealing equipment as claimed in claim 1, wherein the upper cover is detachably covered on the seat, and the material to be annealed is detachably positioned in the accommodating chamber surrounded and formed by the seat and the upper cover.

13. The fast annealing equipment as claimed in claim 1, wherein the resonant chamber is a structure of single $TM_{010}$ resonance mode, and the material to be annealed is heated over 1,500 degrees Celsius to 2,000 degrees Celsius.

14. The fast annealing equipment as claimed in claim 1, wherein the wafer carrier base of the resonant chamber is made of the microwave absorbing material, and enables more than 50% of the microwave to penetrate to heat the material to be annealed.

15. The fast annealing equipment as claimed in claim 14, wherein the microwave absorbing material is porous sintered silicon carbide with a porosity between 20% and 30%, or graphite.

16. The fast annealing equipment as claimed in claim 1, wherein the first frequency of the microwave is in a range of 433.05-434.79 MHz or 902-928 MHz, a frequency sweep range of the frequency sweep mode is ±10 MHZ, the resonant chamber is a structure of single $TM_{010}$ resonance mode, and a cavity quality factor (Q) of the resonant chamber exceeds 6,000.

17. The fast annealing equipment as claimed in claim 1, wherein the first frequency of the microwave is 434 MHz, and a diameter of the resonant chamber is 500 mm.

18. The fast annealing equipment as claimed in claim 1, wherein the first frequency of the microwave is 500 MHz.

19. The fast annealing equipment as claimed in claim 1, wherein the material to be annealed is silicon carbide.

20. The fast annealing equipment as claimed in claim 1, wherein the material to be annealed is a silicon carbide wafer.

* * * * *